United States Patent
Yoshida et al.

(10) Patent No.: US 6,633,588 B1
(45) Date of Patent: Oct. 14, 2003

(54) DATA TRANSFERRING DEVICE

(75) Inventors: Tadahiro Yoshida, Osaka (JP); Hiroyuki Yamauchi, Osaka (JP); Hironori Akamatsu, Osaka (JP); Satoshi Takahashi, Osaka (JP); Yutaka Terada, Osaka (JP); Yukio Arima, Osaka (JP); Takashi Hirata, Osaka (JP); Yoshihide Komatsu, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/410,764

(22) Filed: Oct. 1, 1999

(30) Foreign Application Priority Data

Oct. 7, 1998 (JP) .......................................... 10-284907

(51) Int. Cl.[7] .............................................. G06F 15/16
(52) U.S. Cl. .......................... 370/489; 709/233; 710/33; 710/60
(58) Field of Search ................................ 370/235, 489; 709/232, 233; 710/31, 32, 33, 60, 305, 307

(56) References Cited

U.S. PATENT DOCUMENTS

| | | | |
|---|---|---|---|
| 3,747,074 A | 7/1973 | Schulze | |
| 5,325,355 A * | 6/1994 | Oprescu et al. | 370/282 |
| 5,384,769 A * | 1/1995 | Oprescu et al. | 370/276 |
| 5,424,657 A * | 6/1995 | Van Brunt et al. | 326/63 |
| 5,485,488 A | 1/1996 | Van Brunt et al. | |
| 5,504,757 A * | 4/1996 | Cook et al. | 370/468 |
| 5,509,126 A * | 4/1996 | Oprescu et al. | 710/307 |
| 5,559,967 A | 9/1996 | Oprescu et al. | |
| 5,579,486 A * | 11/1996 | Oprescu et al. | 710/107 |
| 5,592,510 A * | 1/1997 | Van Brunt et al. | 375/220 |
| 5,778,204 A * | 7/1998 | Van Brunt et al. | 710/305 |
| 5,802,057 A | 9/1998 | Duckwall et al. | |
| 5,828,733 A | 10/1998 | Barton et al. | |
| 5,907,553 A * | 5/1999 | Kelly et al. | 370/433 |
| 5,913,075 A * | 6/1999 | Beers et al. | 710/69 |
| 5,958,033 A * | 9/1999 | Schubert et al. | 710/300 |
| 5,978,869 A * | 11/1999 | Guthrie et al. | 710/60 |
| 6,137,949 A * | 10/2000 | Horiguchi et al. | 370/233 |
| 6,425,041 B1 * | 7/2002 | Klein | 710/306 |

FOREIGN PATENT DOCUMENTS

| | | |
|---|---|---|
| EP | 0817438 A2 | 1/1998 |
| EP | 0825783 A2 | 2/1998 |

\* cited by examiner

*Primary Examiner*—Hassan Kizou
*Assistant Examiner*—Anh Vu H Ly
(74) *Attorney, Agent, or Firm*—McDermott, Will & Emery

(57) ABSTRACT

First and second nodes are coupled together by a bus. The first node includes a detecting circuit for detecting the maximum data transfer capability of a connected node, at least two receiving circuits for receiving data from the bus, and a controlling circuit for selecting, based on an output signal from the detecting circuit and for optimizing the configuration of a receiving unit so as to bring the other of the receiving circuits to a stop. The second node includes a transmitting circuit for transmitting data to the bus and a notifying circuit for notifying the first node of its own maximum transfer capability.

6 Claims, 4 Drawing Sheets

TO DETECTING CIRCUIT 3

TO DETECTING CIRCUIT 3

DATA TRANSFERRING DEVICE

BACKGROUND OF THE INVENTION

The present invention relates to a data transferring device for communicating data between a plurality of nodes. More specifically, the present invention relates to a data transferring device capable of selectively using one of multiple data transfer rates between nodes.

As an international standard for high-speed serial bus transfer methods, the IEEE 1394-1995 standard has been known in the art. In this IEEE 1394-1995 standard, although it is possible to couple a plurality of nodes of different data transfer capabilities to a single bus, the maximum data transfer capability between two nodes depends on the maximum data transfer capability of a node existing between these two nodes. More specifically, three different data transfer rates of 100, 200, and 400 megabits per second (Mbps) are supported, and it is possible to learn the data transfer rate of a connection destination by the process of bus initialization or by the application of a speed signal just before a packet transfer.

Conventional data transferring devices in conformity to the IEEE 1394-1995 standard have some problems. For example, when a node having a high-speed data transfer capability (herein after called the high-speed node) is coupled to another having a low-speed data transfer capability (the low-speed node), it is not necessary for the high-speed node to use its internal circuit disposed for handling high-speed data transfers, therefore resulting in waste of bias to such a circuit.

SUMMARY OF THE INVENTION

The present invention was made with a view to providing a solution to the above-described problem with the prior art technology. Accordingly, an object of the present invention is to provide a data transferring device capable of configuring an optimal circuit according to the data transfer capability of a connection destination for achieving the reduction of power consumption.

In order to achieve the object described above, the present invention discloses a first data transferring device which is constructed of at least two nodes of which first and second nodes are coupled together by a bus, wherein the first node includes a detecting circuit for detecting the maximum data transfer capability of a connected node, at least two receiving circuits for receiving data from the bus, and a controlling circuit for selecting, based on an output signal from the detecting circuit, one of the receiving circuits and for performing control so as to bring the other of the receiving circuits to a stop, and wherein the second node includes a transmitting circuit for transmitting data to the bus and a notifying circuit for notifying the first node of its own maximum data transfer capability via the transmitting circuit.

The present invention discloses a second data transferring device which is constructed of at least two nodes of which first and second nodes are coupled together by a bus, wherein the first node includes a detecting circuit for detecting the maximum data transfer capability of a connected node, a receiving circuit for receiving data from the bus, a bias adjusting circuit for adjusting a bias for the receiving circuit, and a controlling circuit for controlling, based on an output signal from the detecting circuit, the bias adjusting circuit, and wherein the second node includes a transmitting circuit for transmitting data to the bus and a notifying circuit for notifying the first node of its own maximum data transfer capability via the transmitting circuit.

DETAILED DESCRIPTION OF THE INVENTION

Embodiments of the present invention will be illustrated by making reference to FIGS. 1 to 4.

Figure 1:
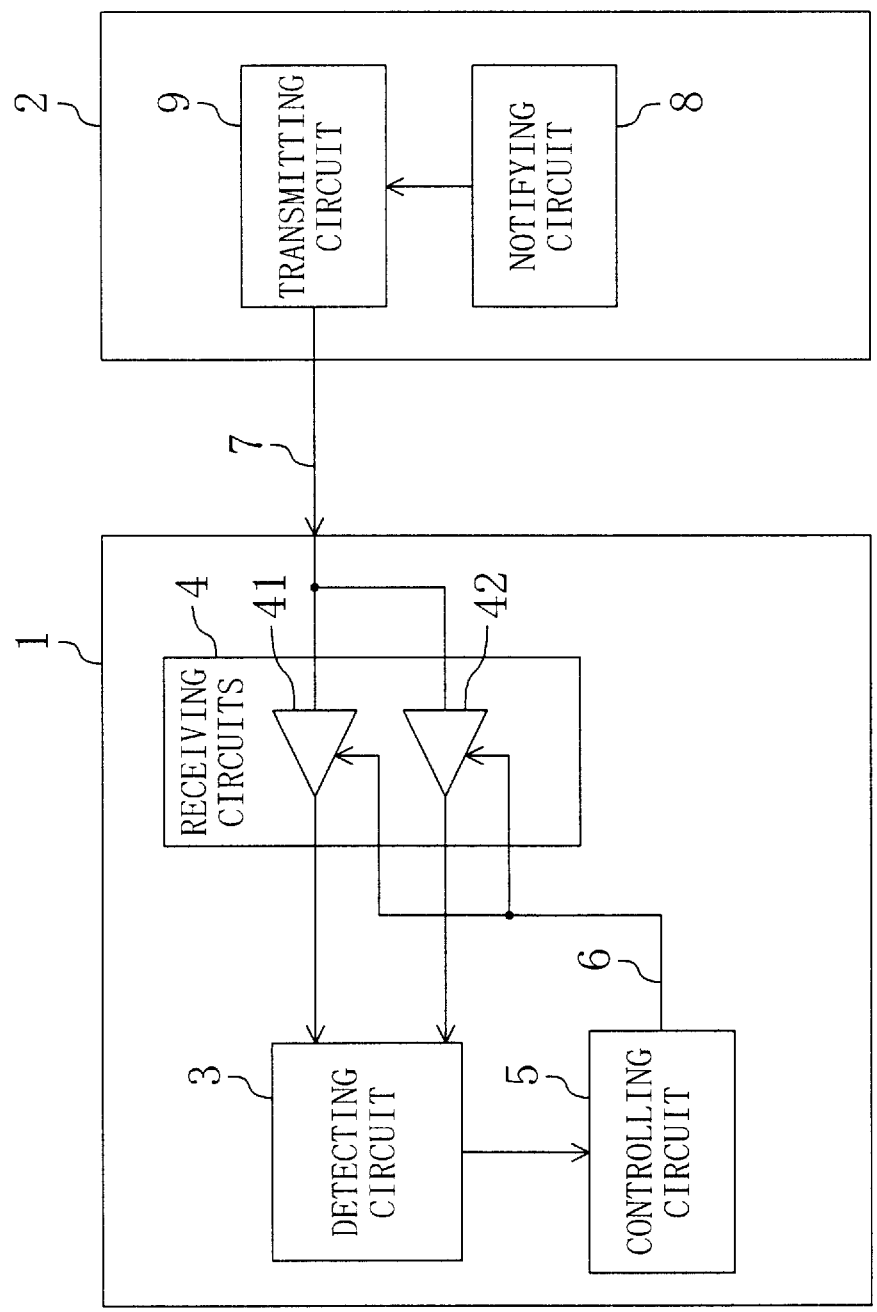
FIG. 1 is a block diagram illustrating an example structure of a data transferring device according to the present invention.

Referring first to FIG. 1, there is shown a structure of the data transferring device according to the present invention. In FIG. 1, the present data transferring device is constructed of at least two nodes (the number of nodes is two in the present embodiment). Connected between first and second nodes 1 and 2 is a bus 7.

The first node 1 includes a receiving unit 4 having at least two receiving circuits for receiving data from the bus 7, a detecting circuit 3 for detecting the maximum data transfer capability of a node as a connection destination, and a controlling circuit 5 for selecting, based on an output signal from the detecting circuit 3, one of the two receiving circuits and for controlling the receiving unit 4 so as to bring the other receiving circuit to a stop. Outputs of the receiving unit 4 are coupled to the detecting circuit 3. An output signal from the detecting circuit 3 is coupled to the controlling circuit 5. Additionally, an output of the controlling circuit 5 is coupled to the receiving unit 4 by a controlling signal 6.

Figure 2A:
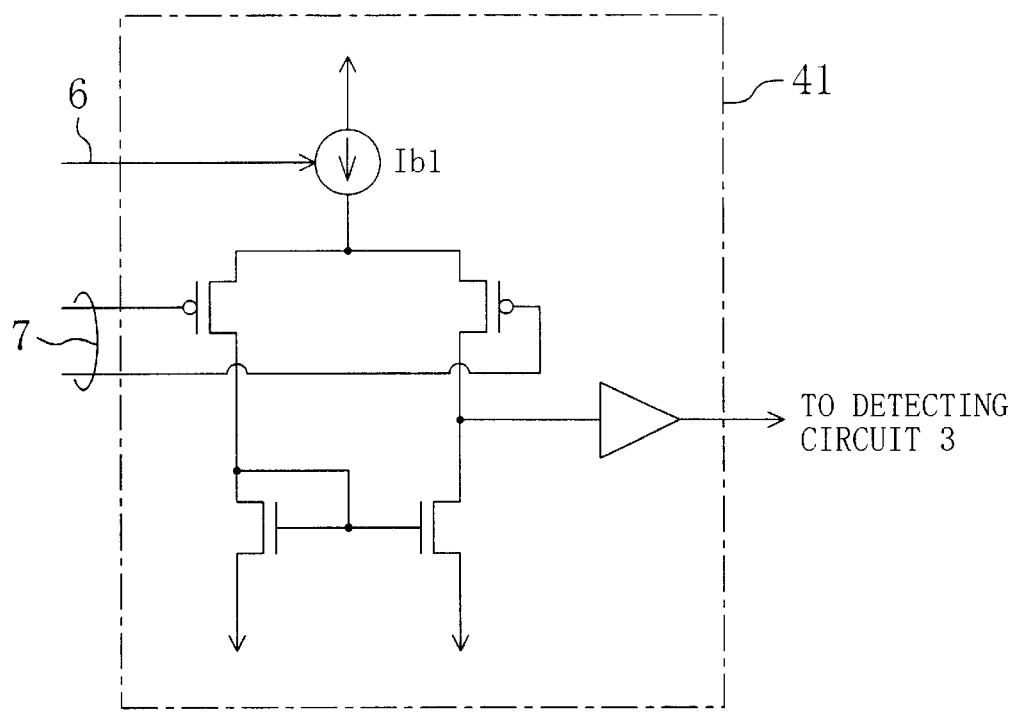
FIG. 2A is a circuit diagram illustrating the structure of one of receiving circuits of FIG. 1
Figure 2B:
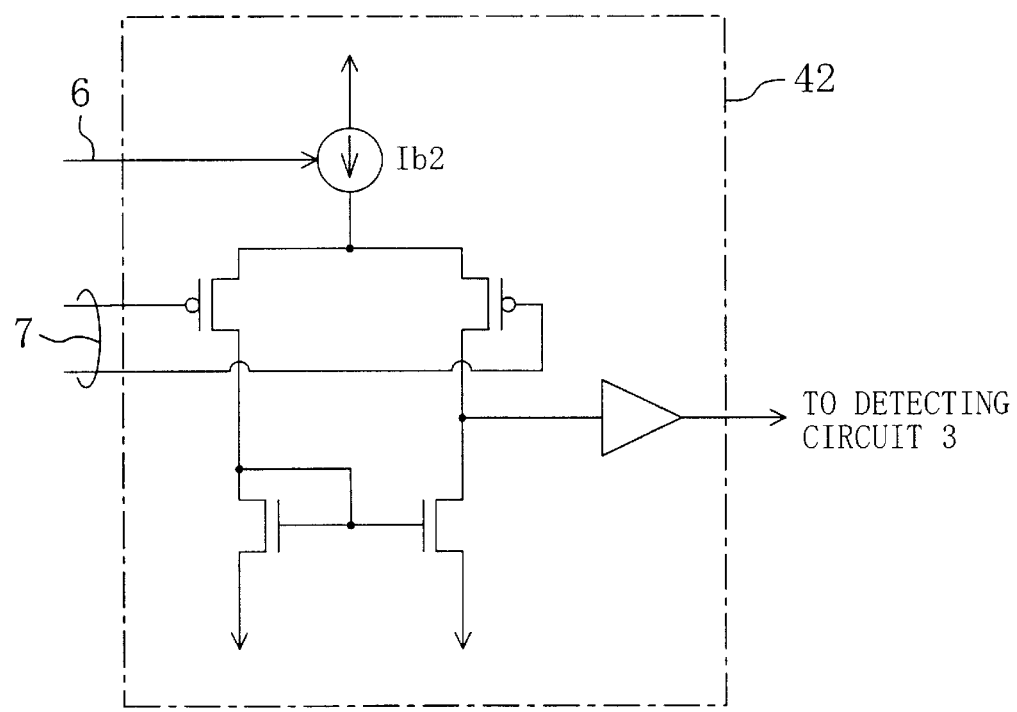
FIG. 2B is a circuit diagram illustrating the structure of the other receiving circuit.

The receiving unit 4 is constructed of a receiving circuit 41 for high-speed data transfers (hereinafter called the high-speed receiving circuit) and a receiving circuit 42 for low-speed data transfers (hereinafter called the low-speed receiving circuit). FIGS. 2A and 2B are circuit diagrams showing details of these two receiving circuits 41 and 42. The receiving circuits 41 and 42 each are implemented by a differential input amplifier having PMOS transistors as an input gate, wherein the value of a bias current Ib1 which is applied to the high-speed receiving circuit 41 is set higher than that of a bias current Ib2 which is applied to the low-speed receiving circuit 42.

As illustrated in FIG. 1, the second node 2 includes a transmitting circuit 9 for transmitting data to the bus 7 and a notifying circuit 8 for notifying, via the transmitting circuit 9, the first node 1 of its own maximum data transfer capability.

In the data transferring device of FIG. 1, the detection circuit 3 is able to learn the data transfer capability of a connection destination according to a signal from the notifying circuit 8. The detecting circuit 3 sends to the controlling circuit 5 such acquired knowledge in the form of a signal. Based on the received signal, the controlling signal 5 selects between the high-speed receiving circuit 41 and the low-speed receiving circuit 42 as follows. If the received signal indicates that the data transfer capability of a connection destination is high, the high-speed receiving circuit 41 is then selected, while the low-speed receiving circuit 42 is brought to a stop by the controlling signal 6. On the other hand, if the received signal indicates that the data transfer capability of a connection destination is low, the low-speed receiving circuit 42 is then selected, while the high-speed receiving circuit 41 is brought to a stop by the controlling signal 6.

According to the data transferring device of FIG. 1 as described above, selection between the high-speed receiving circuit 41 and the low-speed receiving circuit 42 is made depending on the connection destination's data transfer capability, therefore making it possible to architect an optimal circuit configuration. When the low-speed receiving circuit 42 is selected, bias current will become less than when the high-speed receiving circuit 41 is selected. This provides the effect of reducing unnecessary power consumption when the data transfer capability of a connection destination is lower than that of the first node 1 itself.

Figure 3:
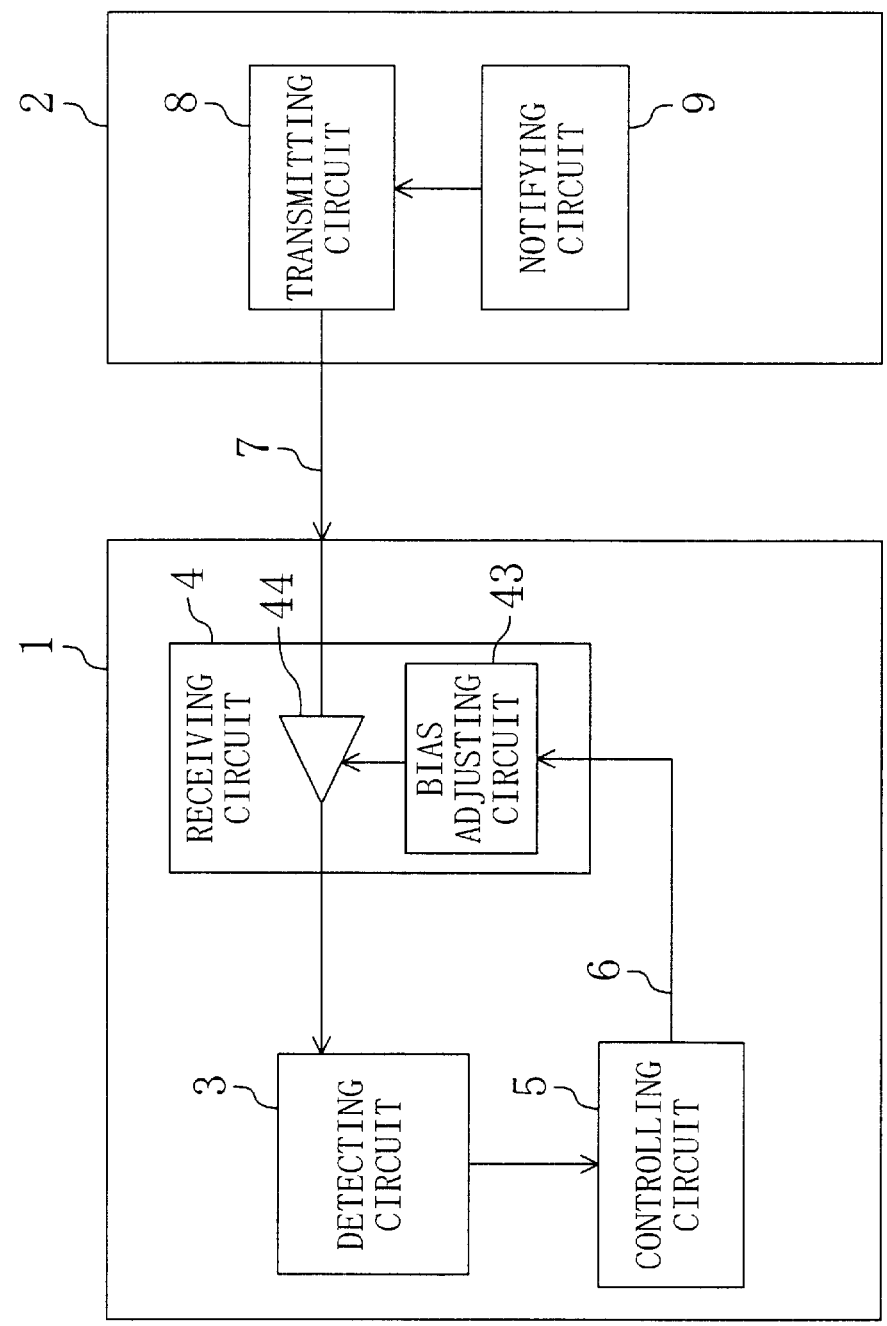
FIG. 3 is a block diagram illustrating an example structure of another data transferring device according to the present invention.

Referring next to FIG. 3, there is shown a structure of another data transferring device according to the present invention. The structure of the present data transferring device is almost identical with the one shown in FIG. 1. Differences between the structures of FIGS. 1 and 3 are as follows. As shown in FIG. 3, the receiving unit 4 is constructed of a receiving circuit 44 which serves not only as a high-speed receiving circuit but also as a low-speed receiving circuit and a bias adjusting circuit 43 for adjusting a bias current for the receiving circuit 44, and an output signal of the bias adjusting circuit 43 is fed to the receiving circuit 44.

Figure 4:
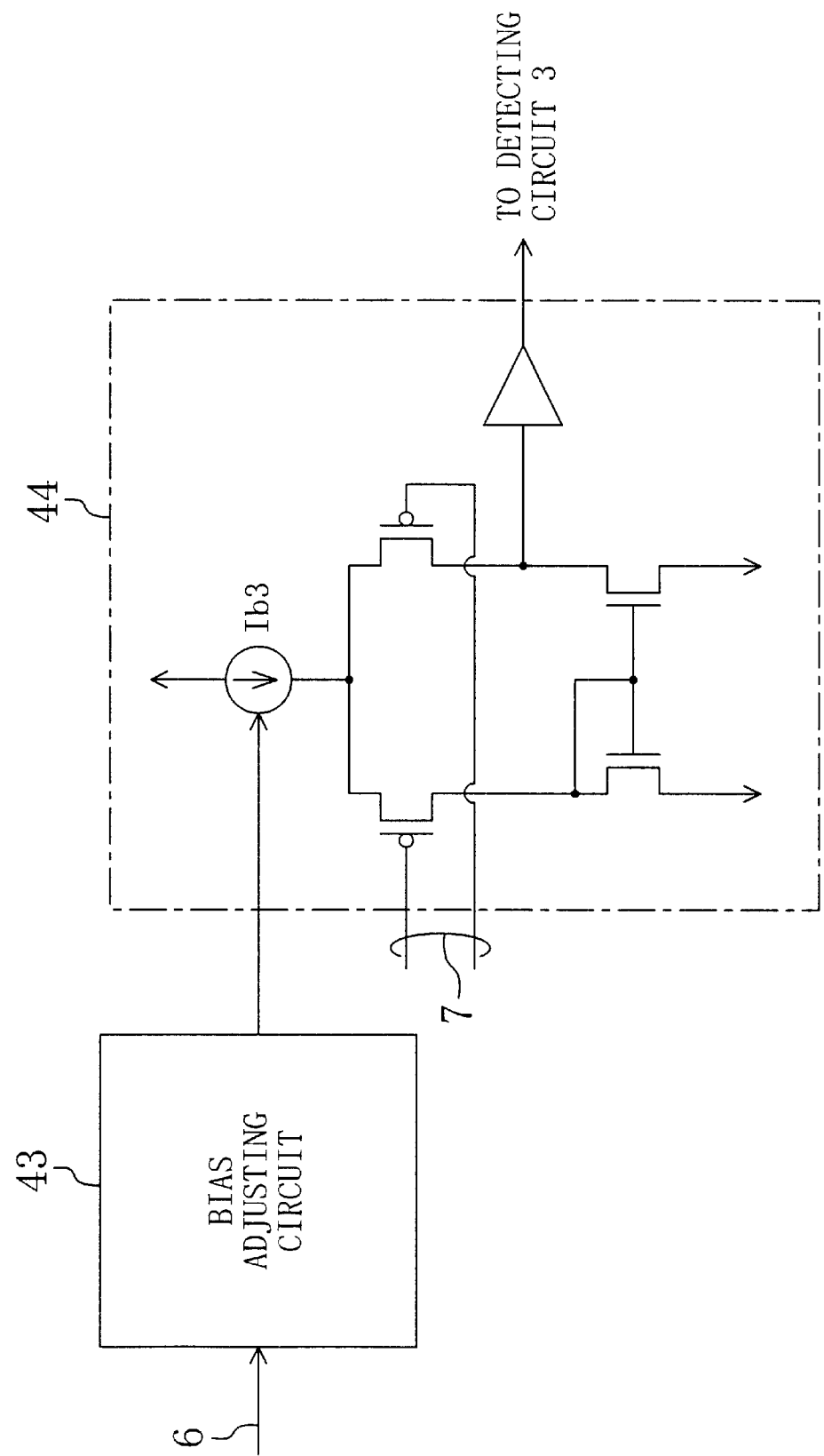
FIG. 4 is a circuit diagram illustrating the structure of a receiving circuit of FIG. 3.

FIG. 4 shows in detail the structure of the receiving circuit 44. Based on the controlling signal 6, the bias adjusting circuit 43 adjusts a bias current for the receiving circuit 44. In other words, if the data transfer capability of a connection destination is high, it is set such that a bias current lb3 will flow in greater quantity. On the other hand, if the data transfer capability of a connection destination is low, it is set such that the bias current lb3 will flow in less quantity.

According to the data transferring device of FIG. 3 as described above, the controlling circuit 5 controls, based on an output signal from the detecting circuit 3, the bias adjusting circuit 43, whereby the bias current lb3 can be set to an appropriate value according to the connection destination's data transfer capability. In addition, there is provided an effect of reducing unnecessary power consumption when the connection destination's data transfer capability is lower than that of the first node 1 itself. Further, since it is arranged for a single receiving circuit to serve not only as a high-speed circuit but also as a low-speed circuit, this provides the effect that circuit area can be reduced. Furthermore, an arrangement may be made, in which a bias voltage for the receiving circuit 44 is subjected to adjustment.

What is claimed is:

1. A data transferring device which is constructed of at least two nodes of which first and second nodes are coupled together by a bus, wherein said first node includes a detecting circuit for detecting the maximum data transfer capability of a connected node, at least two receiving circuits for receiving data from said bus, and a controlling circuit for selecting, based on an output signal from said detecting circuit, one of said receiving circuits and for performing control so as to bring the other of said receiving circuits to a stop, and wherein said second node includes a transmitting circuit for transmitting data to said bus and a notifying circuit for notifying said first node of its own maximum data transfer capability via said transmitting circuit.

2. The data transferring device in accordance with claim 1, wherein said at least two receiving circuits each are constructed of a differential input amplifier.

3. The data transferring device in accordance with claim 1, wherein said at least two receiving circuits are coupled to different bias sources.

4. The data transferring device in accordance with claim 1, wherein said at least two receiving circuits are supplied with different bias values.

5. A data transferring device which is constructed of at least two nodes of which first and second nodes are coupled together by a bus, wherein said first node includes a detecting circuit for detecting the maximum data transfer capability of a connected node, a receiving circuit for receiving data from said bus, a bias adjusting circuit for adjusting a bias for said receiving circuit, and a controlling circuit for controlling, based on an output signal from said detecting circuit, said bias adjusting circuit, and wherein said second node includes a transmitting circuit for transmitting data to said bus and a notifying circuit for notifying said first node of its own maximum data transfer capability via said transmitting circuit.

6. The data transferring device in accordance with claim 5, wherein said receiving circuit is constructed of a differential input amplifier.

* * * * *